April 18, 1944.   G. O. GRIDLEY   2,347,099

REVERSE GEAR

Filed June 24, 1941

INVENTOR
GEORGE O. GRIDLEY.
BY
Mitchell Bechert
ATTORNEYS

Patented Apr. 18, 1944

2,347,099

UNITED STATES PATENT OFFICE 2,347,099

REVERSE GEAR

George O. Gridley, Berlin, Conn., assignor to The New Britain Machine Company, New Britain, Conn., a corporation of Connecticut Application June 24, 1941, Serial No. 399,433

2 Claims. (Cl. 74—297)

This invention relates to a reversing gear particularly adapted for marine installations although suitable for use in other fields.

An object of the invention is to provide a reversing gear of simple, inexpensive construction and designed as a unitary mechanism especially suitable to transmit the power of a driving unit such as an engine to a propeller or the like.

A further object is to provide a reversing gear in which forward and reverse drive may be obtained without the shifting of gears or engagement of toothed clutches whereby greater speed in changing from one direction of drive to the other may be obtained and whereby wear and tear may be minimized.

Another object is to provide a reverse gear so arranged as to cause the propeller shaft thrust to urge appropriate clutch members into engagement with each other.

The invention and its objects, advantages and features will be more clearly realized from the following specification which describes an illustrative embodiment shown in the accompanying drawing.

In the drawing—

Figure 1:
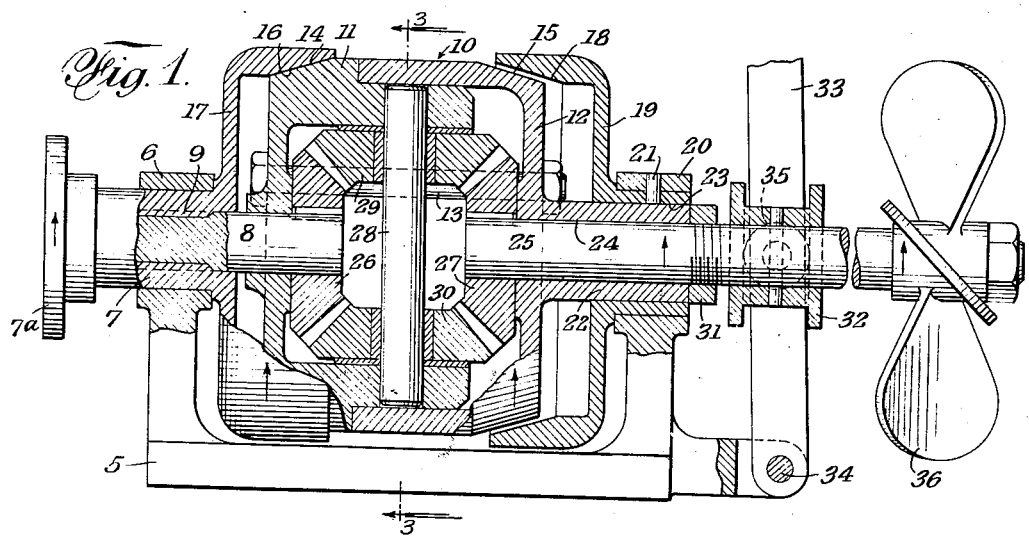
Fig. 1 is a vertical sectional view of a reversing gear incorporating the invention and positioned for forward drive.

In that form of the invention which is illustrated, a support or frame 5 is provided, said frame being formed with a bearing 6 for a stub shaft 7. The shaft 7, as by means of the flange 7ª, is adapted to be connected to a primary driver such as a motor or engine. Thus, the shaft 7 is a driving member of the reversing gear, as will be later described.

The drive shaft 7 is preferably hollow to accommodate a second drive shaft 8 which receives motion from the drive shaft 7 as by means of the splined connection 9 therebetween, the shaft 8 being axially movable as will become apparent.

The present reversing gear includes a gear set in a housing or cage 10 which, in the present instance, is made of the nested parts 11 and 12 secured together as by means of bolts 13. This separable or equivalent structure is employed to facilitate the assembly, within the cage, of gears used in the mechanism.

The cage 10 is preferably formed with friction-connection faces 14 and 15 at opposite sides thereof. A cooperating friction-connection face 16 for the face 14 is provided on an enlarged friction-connection cup 17 preferably integrally formed with the drive shaft 7. In a similar manner, a cooperating friction-connection face 18 for the face 15 is provided on friction-connection cup 19 carried by a bearing bracket 20. The cup 19 is preferably fixed against rotation on the frame 5 as by means of a pin 21. The friction-connection comprising faces 14 and 16 may be considered as a clutch and the connection comprising faces 15 and 18 may be considered as a brake.

The part 12 of the cage 10 is preferably provided with a sleeve extension 22 which is both slidably and rotatably arranged in an axial bore 23 provided in the brake cup 19. The sleeve 22 has a bore 24 to receive a driven shaft 25 arranged coaxially with the shaft 8.

The shafts 8 and 25 are preferably arranged to extend within the cage 10 and on the inward extensions there are secured the respective gears 26 and 27. The cage 10 carries a transverse pin shaft 28 which is preferably mounted in the cage part 11 and retained against displacement by the cage part 12. The shaft 28 carries gears 29 and 30 each in mesh with both gears 26 and 27. Because of their arrangement the gears are bevel gears. A collar 31 is provided on the shaft 25 to serve as an abutment for the extension 22.

It will be seen that the cage 10 together with the gears therein and the shafts 8 and 25 are mounted for unitary axial movement on the bearing brackets 6 and 20. Means are provided to effect such movement and in this instance comprises a spool 32 fixedly carried by the shaft 25 and a shift lever 33 pivoted at 34 on the frame 5 and provided with a roller 35 engaged with the spool 32.

The shaft 25 may be suitably extended and on the end thereof propulsion means such as the propeller 36 may be provided.

The reversing gear thus described operates in the following manner:

When the shift lever 33 is moved to the left as in Fig. 1, the clutch faces 14 and 16 are brought into driving engagement to cause bodily rotation of the cage 10 imparted by the driving shaft 7. The gears 29 and 30 will thus revolve, in a planetary manner, about the axis of the shafts 8 and 25. Since the shaft 7 also imparts rotation to the shaft 8 and thus to the gear 26, the latter gear rotates once for each revolution of the gears 29 and 30 about the axis of the shaft 8. Hence, there is no rotation of the latter gears about their own axis. Being thus relatively fixed, the gears 29 and 30 will impart rotation to the gear 27 which, because of its key connection with the shaft 25, imparts similar rotation to that shaft. There is thus effected a one-to-one drive, in the same or forward direction, between the driving shaft 7 and the driven shaft 25, and the propeller 36. It will be noted that the propeller blades are so directed as to cause its thrust to maintain the driving contact of the clutch faces 14 and 16.

Figure 2:
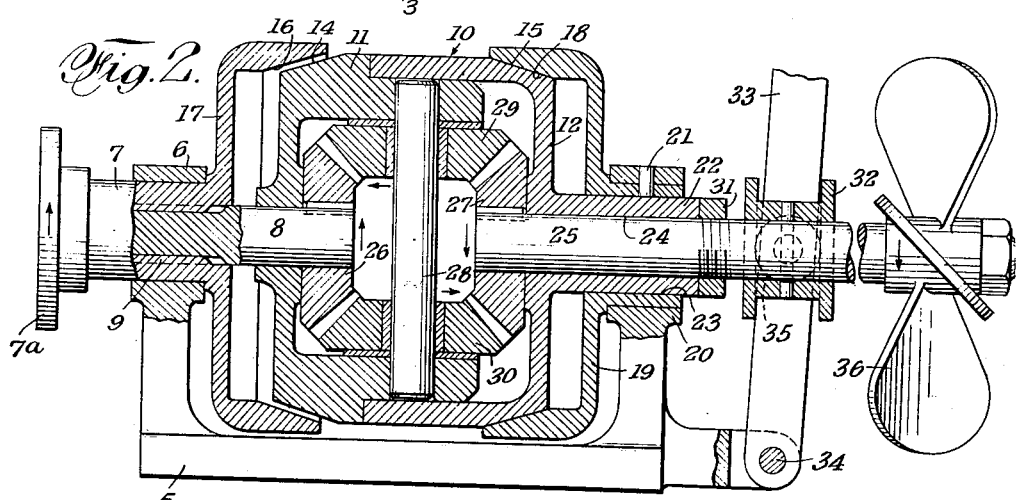
Fig. 2 is a similar view of the reversing gear positioned for reverse drive.
Figure 3:
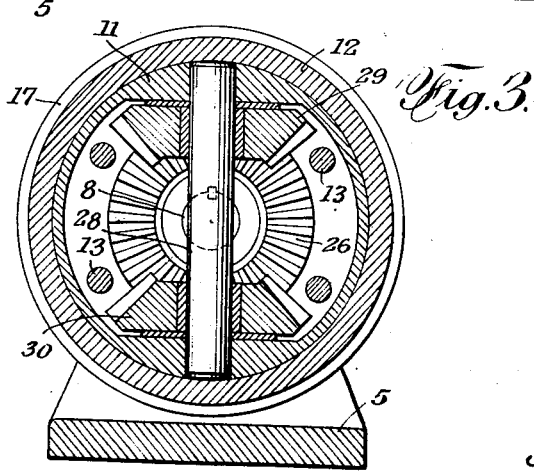
Fig. 3 is a transverse sectional view as taken along the plane of the line 3—3 of Fig. 1.

Reverse drive is effected by shifting the lever 33 to the position shown in Fig. 2. The brake faces 15 and 18 are brought into driving contact to lock the cage 10 against bodily rotation because of the fixed mounting of the brake cup 19. The drive rotation of the shaft 7 is now imparted to the shaft 8 and thus to the gear 26, which rotates the gears 29 and 30 around their own axis shaft 28. As disclosed by the arrows, the gears 29 and 30 now rotate the gear 27 in a direction opposite to that of the drive shafts 7 and 8 to cause similar rotation of the driven shaft 25 and of the propeller 36. In this manner a one-to-one reverse drive is imparted to the propeller and the reverse thrust on the shaft 25 will urge the brake members 15—18 into engagement with each other.

Although not shown, usual and well-known means may be provided to hold the shift lever 33 in either of the positions shown or in a neutral position where the clutch faces 14 and 16, and the brake faces 15 and 18 are out of contact. In the latter position, the drive is imparted to the gear 26 which spins the gears 29 and 30. The resistance to movement offered by the propeller will seek to maintain the gear 27 stationary so that the spinning of the gears 29 and 30 will resolve itself into a bodily rotation of the cage 10, the gears 29 and 30 merely rolling around the gear 27.

From the foregoing, it may be seen that a simple and efficient reversing gear incorporating the features of the invention has been provided. An important feature of the invention is the arrangement of the thrust shaft 25 and the clutch and brake members in such a way as to cause the clutch and brake members to be urged into engagement with each other by reason of the thrust shaft. Various gearing arrangements may be utilized while still retaining that important feature. Inasmuch as many variations may be constructed, it should be understood that the invention as defined by the following claims should not be limited by this specific disclosure of an exemplary embodiment of the invention.

I claim:

1. In a reversing gear, a frame, a member fixed thereon and having a braking face, a driving member rotatable relatively to said frame and having a driving face, a shiftable cage comprising a pair of cup-like members axially interengageable with each other and secured together and defining an internal open space, each of said cup-like members having a face for engagement with one of the aforesaid faces, a gear within said space in said cage, means for driving said gear with said rotatable driving member, an axially shiftable propeller driving shaft engageably mounted for axially shiftable movement with said cage, a gear rotatable with said propeller driving shaft and positioned in said space in said cage, a third gear in said space and constantly meshing with said two first mentioned gears, and means for shifting said propeller driving shaft and cage axially to cause the separate faces on the latter to alternately engage said driving and braking faces, whereby the propeller thrust will urge said faces on said cage into engagement with said driving face or said braking face depending on the direction of rotation of said propeller driving shaft.

2. In a reversing gear, a frame having a fixed braking face, a driving member rotatable relatively to said frame and having a driving face, a shiftable cage comprising a pair of cup-like members axially interengageable with each other, the circumferential wall of one cup-like member extending in overlapping relation to the circumferential wall of the other cup-like member, a transverse shaft mounted in said last mentioned circumferential wall and having its ends axially within the first mentioned circumferential wall, a rotatable gear mounted on said transverse shaft, a second gear meshing with said first gear and driven by said driving member, a propeller shaft, a third gear secured to said propeller shaft and meshing with said first gear, said shiftable cage having faces for alternate engagement with said braking and driving faces, and means for shifting said propeller shaft and cage for causing said alternate engagement of said faces.

GEORGE O. GRIDLEY.